United States Patent
Uemura et al.

[11] Patent Number: 5,918,510
[45] Date of Patent: Jul. 6, 1999

[54] ROTARY INDEXING APPARATUS

[75] Inventors: Satoru Uemura, Kariya; Hidekazu Hirano, Tokoname, both of Japan

[73] Assignee: Toyoda Koki Kabushiki Kaisha, Kariya, Japan

[21] Appl. No.: 08/892,170

[22] Filed: Jul. 14, 1997

[30] Foreign Application Priority Data

Jul. 15, 1996 [JP] Japan .................................... 8-202832

[51] Int. Cl.⁶ .......................... B23B 29/24; F16D 11/06; F16D 19/00; F16D 65/24

[52] U.S. Cl. .......................... 74/813 L; 74/814; 192/79; 192/85 AT; 192/84.1; 188/170

[58] Field of Search .................................. 74/813 L, 814, 74/825; 408/1; 192/79, 85 AT, 84.1; 188/170; 53/530; 137/625.23; 144/278.1; 300/11; 242/434; 184/57

[56] References Cited

U.S. PATENT DOCUMENTS

| | | | |
|---|---|---|---|
| 3,045,790 | 7/1962 | Becker | 192/79 |
| 3,586,136 | 6/1971 | Kamman | 188/170 |
| 3,743,061 | 7/1973 | Brown | 188/170 |
| 5,201,249 | 4/1993 | Sterenberg | 74/825 |
| 5,450,771 | 9/1995 | Carter | 74/813 L |
| 5,566,803 | 10/1996 | Lidner | 192/84.1 |
| 5,711,345 | 1/1998 | Phillips | 137/625.23 |

FOREIGN PATENT DOCUMENTS

| | | |
|---|---|---|
| 4-46737 | 2/1992 | Japan . |
| 8-10505 | 3/1996 | Japan . |

*Primary Examiner*—Charles A. Marmor
*Assistant Examiner*—Roger Pang
*Attorney, Agent, or Firm*—Oblon, Spivak, McClelland, Maier & Neustadt, P.C.

[57] ABSTRACT

A rotary indexing apparatus includes a base, a table rotatably supported on the base, a drive unit for rotating the table, and a clamp ring fixed to the base to surround the table. Interference fit is established between the clamp ring and the table in order to clamp the table. There is also provided a mechanism for deflecting the clamp ring in order to unclamp the table.

3 Claims, 7 Drawing Sheets

ROTARY INDEXING APPARATUS

BACKGROUND OF THE INVENTION

1. Field of the Invention

The present invention relates to a rotary indexing apparatus for indexing a rotary member such as a turntable of a machine tool.

2. Discussion of the Related Art

Japanese Utility Model Publication (kokoku) No. 8-10505 discloses a direct-drive-type rotary indexing table which can be rotated for indexing with no vertical movement of the table.

However, the complex structure of the conventional rotary indexing table increases production costs thereof and makes reducing the overall size difficult. The conventional rotary indexing table has a clamp mechanism composed of a cylinder disposed under the table in the vicinity of the rotation center of the table, and a piston which is pressed against the bottom surface of the table by the pressure of operation fluid supplied to the cylinder. Therefore, there exists a limit on the clamping force generated by the clamp mechanism.

Especially, when the overall size is reduced, the clamping force decreases due to a decrease in the diameter of the cylinder. Although this problem can be solved by increasing the pressure of operation fluid supplied to the cylinder, there arises a possibility that the cylinder, the piston, bolts, an o-ring, and the like are damaged.

In addition, since the cylinder or the piston is in frictional engagement with the bottom surface of the table, the surfaces involved in the frictional engagement are subjected to wear. Therefore, such surfaces must be lubricated.

SUMMARY OF THE INVENTION

In view of the above-described problems, an object of the present invention is to provide an improved rotary indexing apparatus which has a simplified structure, which can be reduced in size, and which imparts a strong clamping force to a rotary member table to be clamped.

To achieve the object, the present invention provides a rotary indexing apparatus that includes a base, a rotary member rotatably supported on the base, drive means for rotating the rotary member, and a clamp ring fixed to the base to surround the rotary member or to be surrounded by the rotary member. Interference fit is established between the clamp ring and the rotary member in order to clamp the rotary member. There is further provided means for deflecting the clamp ring in order to unclamp the rotary member.

In the rotary indexing apparatus of the present invention, since interference fit is established between the clamp ring and the rotary member, a strong clamping force can be generated upon clamping operation. In addition, an unclamped state is easily established through deflection of the clamp ring by supply of pressurized oil, the structure can be simplified, and a cylinder having a large diameter becomes unnecessary, so that the size and costs of the indexing apparatus can be decreased.

In addition, while pressurized oil is not supplied, the rotary indexing apparatus is maintained in the clamped state. Therefore, even when supply of pressurized oil is stopped due to power failure or the like, the rotary member is not brought into the free state. Accordingly, the structure of the rotary indexing apparatus is advantageous from the viewpoint of safety.

Moreover, since the size of the indexing apparatus is small, a tilt-and-turn table can be formed through combination of a main table and an auxiliary table whose base is attached to the main table such that the axis of the auxiliary table perpendicularly intersects the axis of the main table.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which.

DETAILED DESCRIPTION OF THE PREFERRED EMBODIMENTS

Embodiments of the present invention will now be described with reference to the drawings.

First Embodiment

Figure 1:
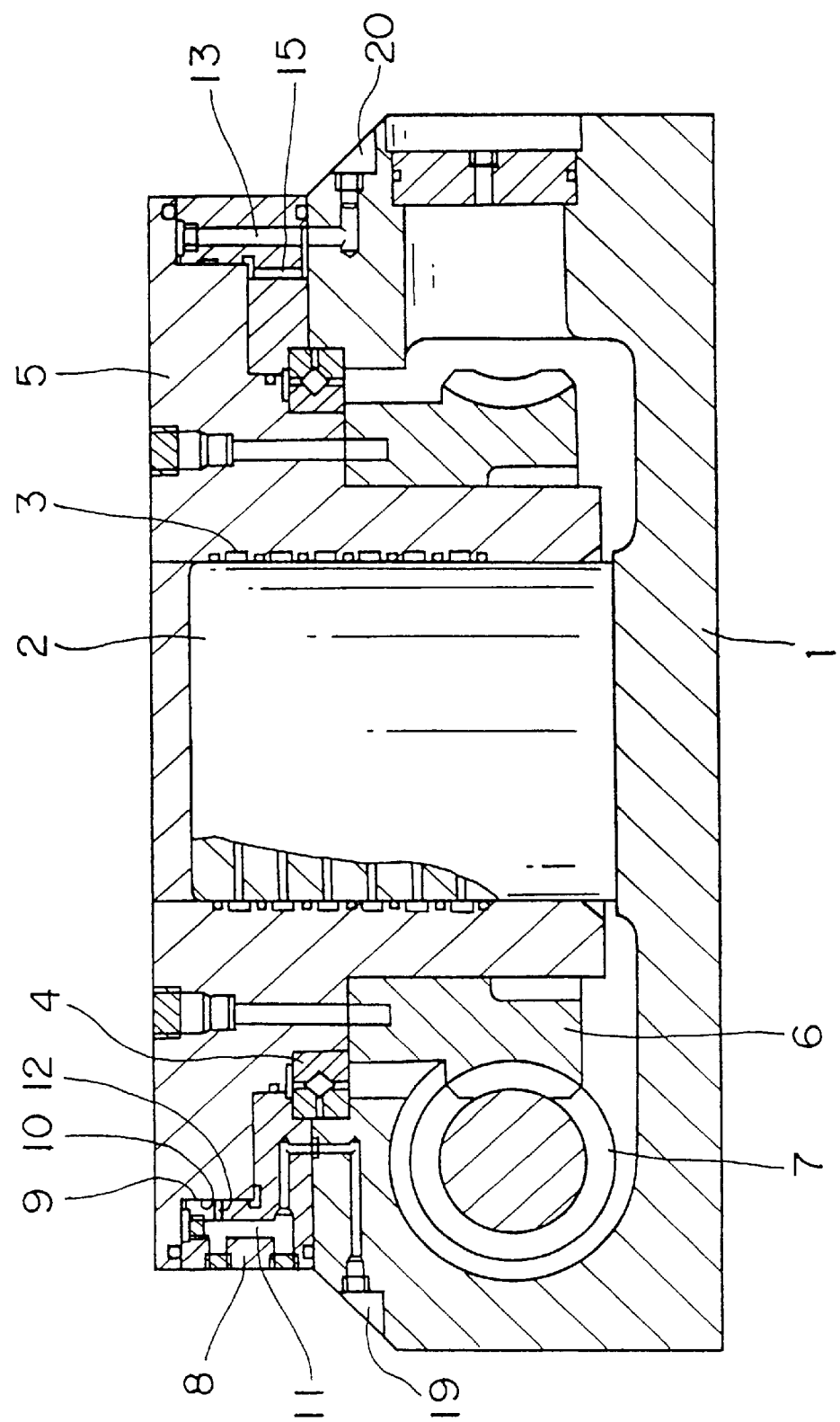
FIG. 1 is a sectional view of a rotary indexing apparatus according to a first embodiment of the present invention.

In FIG. 1, numeral 1 denotes a base, on the center of which a support shaft 2 is vertically disposed. A table 5 is fit onto the support shaft 2 via a distributor 3 and is rotatably supported by the base 1 via a cross roller bearing 4. The distributor 3 supplies operation fluid to jigs and like components provided on the table 5.

To the bottom surface of the table 5 is fixed a worm wheel 6, with which a worm gear 7 is meshed. The worm gear 7 is driven by an unillustrated rotary drive mechanism. The table 5 is indexed by this gear mechanism.

A clamp ring 8 is disposed to surround the peripheral surface of the table 5 and fixed to the base 1 with unillustrated bolts. The clamp ring 8 has a clamp surface 9 which faces a pressure reception surface 10 of the table 5.

The inner diameter of the clamp surface 9 of the clamp ring 8 is designed to be slightly smaller than the diameter of the pressure reception surface 10 of the table 5, so that interference fit is established between the clamp surface 9 and the pressure reception surface 10; i.e., interference of a predetermined amount exists between the clamp surface 9 and the pressure reception surface 10.

The table 5 and the clamp ring 8 are assembled together through a so-called shrinkage fit. That is, the table 5 is fit into the clamp ring 8 while the clamp ring 8 is heated and expanded.

In the clamp ring 8 are provided pressure oil supply passages 11 and oil collection passages 13 which are alternately formed in the circumferential direction. Each of the supply passages 11 communicates with a pressurized oil supply port 19 provided in the base 1 and with a horizontal hole 12 formed in the clamp ring 8 in order to supply the pressure reception surface 10 with pressurized oil. Each of the oil collection passages 13 communicates with an oil collection port 20 provided in the base 1 and with a vertical hole 15 formed in the clamp ring 8 in order to collect the oil supplied to the pressure reception surface 10.

When no pressurized oil is supplied to the pressure reception surface 10, interference fit is established between the clamp surface 9 of the clamp ring 8 and the pressure reception surface 10 of the table 5, so that there can be obtained a larger clamping force compared to the case of hydraulic clamping.

When the table 5 is to be rotated for carrying out an indexing operation, pressurized oil is supplied to the pressure reception surface 10, so that the clamp ring 8 deflects in the outward direction. As a result, the interference fit established between the clamp surface 9 of the clamp ring 8 and the pressure reception surface 10 of the table 5 is canceled, so that an unclamped state is established in order to allow rotation of the table 5 relative to the clamp ring 8. In this state, a predetermined indexing operation is carried out.

Since the table 5 is supported by the base 1 through only the cross roller bearing 4, no sliding surface exists between the table 5 and the base 1, so that there is no possibility of surface wear and lubrication is not necessary. Moreover, since the table 5 is not moved vertically in the course of the above-described indexing operation, a complicated bearing structure is not necessary and no clamping force acts on the bearing.

The pressurized oil supplied to the pressure reception surface 10 flows through a clearance between the clamp ring 8 and the table 5 and enters the oil collection passage 13. Subsequently, the pressurized oil is discharged from the oil collection port 20 to be collected by a collection tank disposed outside the base 1.

Second Embodiment

A rotary indexing apparatus of the second embodiment is substantially the same as that of the first embodiment except that a built-in motor is used in the present embodiment.

Figure 2:
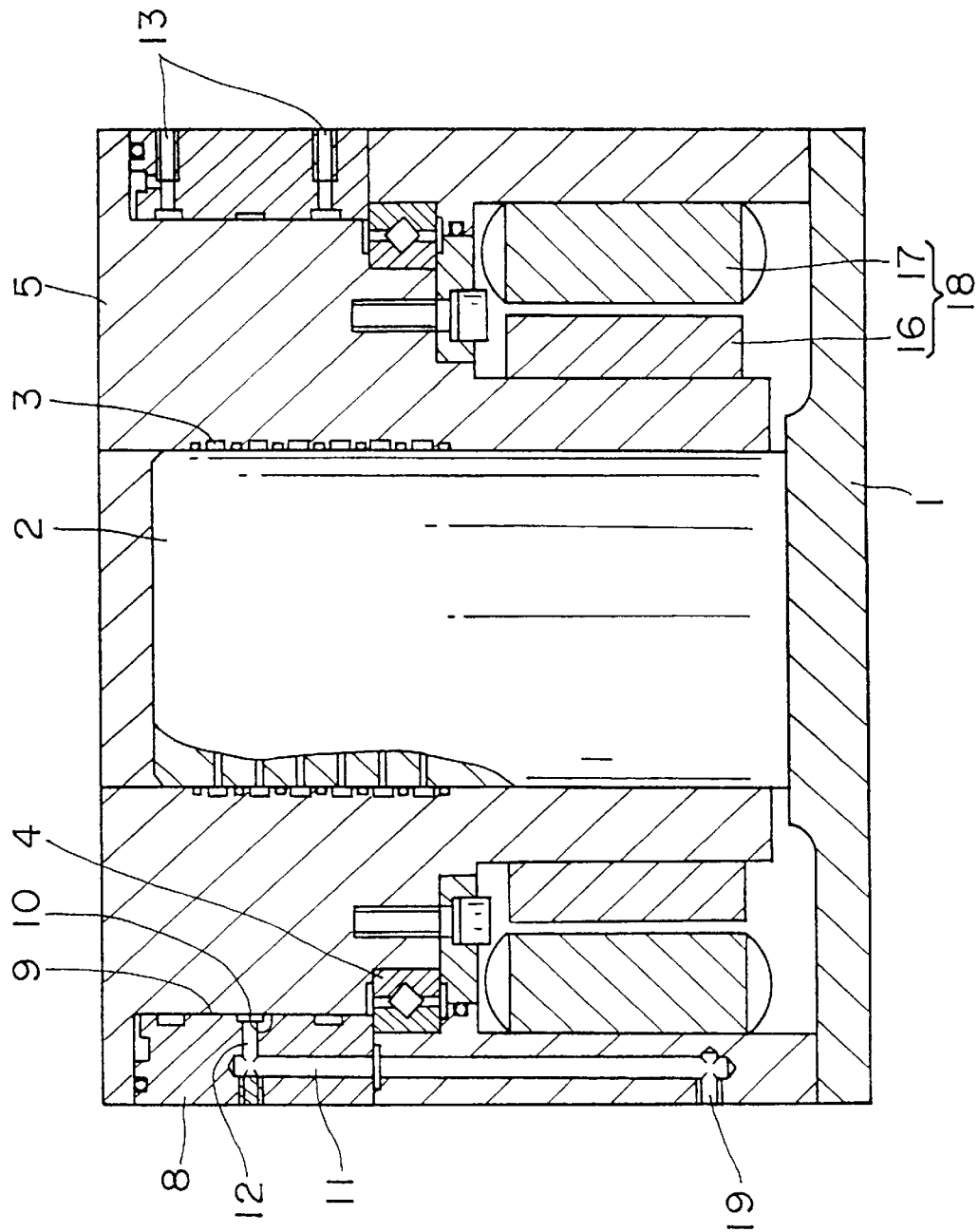
FIG. 2 is a sectional view of a rotary indexing apparatus according to a second embodiment of the present invention.

In FIG. 2, numeral 1 denotes a base, at the center of which a support shaft 2 is vertically disposed. A table 5 is fit onto the support shaft 2 via a distributor 3 and is rotatably supported by the base 1 via a cross roller bearing 4. The distributor 3 supplies operation fluid to jigs and like components provided on the table 5.

A rotor 16 is fixed to a lower portion of the table 5, and a stator 17 is fixed to the base 1 such that the stator 17 surrounds the rotor 16. The rotor 16 and the stator 17 constitute a direct motor 18 for indexing the table 5.

A clamp ring 8 is disposed to surround a pressure reception surface 10 of the table 5 and fixed to the base 1 with unillustrated bolts. The clamp ring 8 has a clamp surface 9 which faces the pressure reception surface 10 of the table 5.

The inner diameter of the clamp surface 9 of the clamp ring 8 is designed to be slightly smaller than that of the pressure reception surface 10 of the table 5, so that interference fit is established between the clamp surface 9 and the pressure reception surface 10; i.e., interference of a predetermined amount exists between the clamp surface 9 and the pressure reception surface 10.

The table 5 and the clamp ring 8 are assembled together through a so-called shrinkage fit. That is, the table 5 is fit into the clamp ring 8 while the clamp ring 8 is heated and expanded.

In the clamp ring 8 are provided pressure oil supply passages 11 and oil collection passages 13 which are alternately formed in the circumferential direction. Each of the supply passages 11 communicates with a pressurized oil supply port 19 formed in the base 1 in order to supply the pressure reception surface 10 with pressurized oil.

When no pressurized oil is supplied to the pressure reception surface 10, interference fit is established between the clamp surface 9 of the clamp ring 8 and the pressure reception surface 10 of the table 5, so that there can be obtained a larger clamping force compared to the case of hydraulic clamping.

When the table 5 is to be rotated for carrying out an indexing operation, pressurized oil is supplied to the pressure reception surface 10, so that the clamp ring 8 deflects in the outward direction. As a result, the interference fit established between the clamp surface 9 of the clamp ring 8 and the pressure reception surface 10 of the table 5 is canceled, so that an unclamped state is established in order to allow rotation of the table 5 relative to the clamp ring 8. In this state, a predetermined indexing operation is carried out.

Since the table 5 is supported by the base 1 through only the cross roller bearing 4, no sliding surface exists between the table 5 and the base 1, so that there is no possibility of surface wear and lubrication is not necessary. Moreover, since the table 5 is not moved vertically in the course of the above-described indexing operation, a complicated bearing structure is not necessary and no clamping force acts on the bearing.

The pressurized oil supplied to the pressure reception surface 10 flows through a clearance between the clamp ring 8 and the table 5 and enters the oil collection passage 13. Subsequently, the pressurized oil is discharged from the oil collection port to be collected by a collection tank disposed outside the base 1.

In the above-described first and second embodiments, pressurized oil for unclamping the table 5 is supplied from the pressurized oil supply passages 11 and is collected by the oil collection passages 13, so that the pressurized fluid circulates. Therefore, the clamp surface 9 of the clamp ring 8 and the pressure reception surface 10 of the table 5 are lubricated. Accordingly, regardless of the fact that the clamp ring 8 is in sliding contact with the table 5, improved durability is secured by the above-described lubrication effect.

Third Embodiment

In the rotary indexing apparatuses of the first and second embodiments, since the pressurized fluid supply passage 11 is formed within the clamp ring 8, the clamp ring 8 must have a large thickness in the radial direction, so that the clamp ring 8 becomes difficult to be deformed. Also, since pressurized fluid is circulated, a pump having a large capacity is needed.

A rotary indexing apparatus of a third embodiment can solve these drawbacks.

Figure 3:
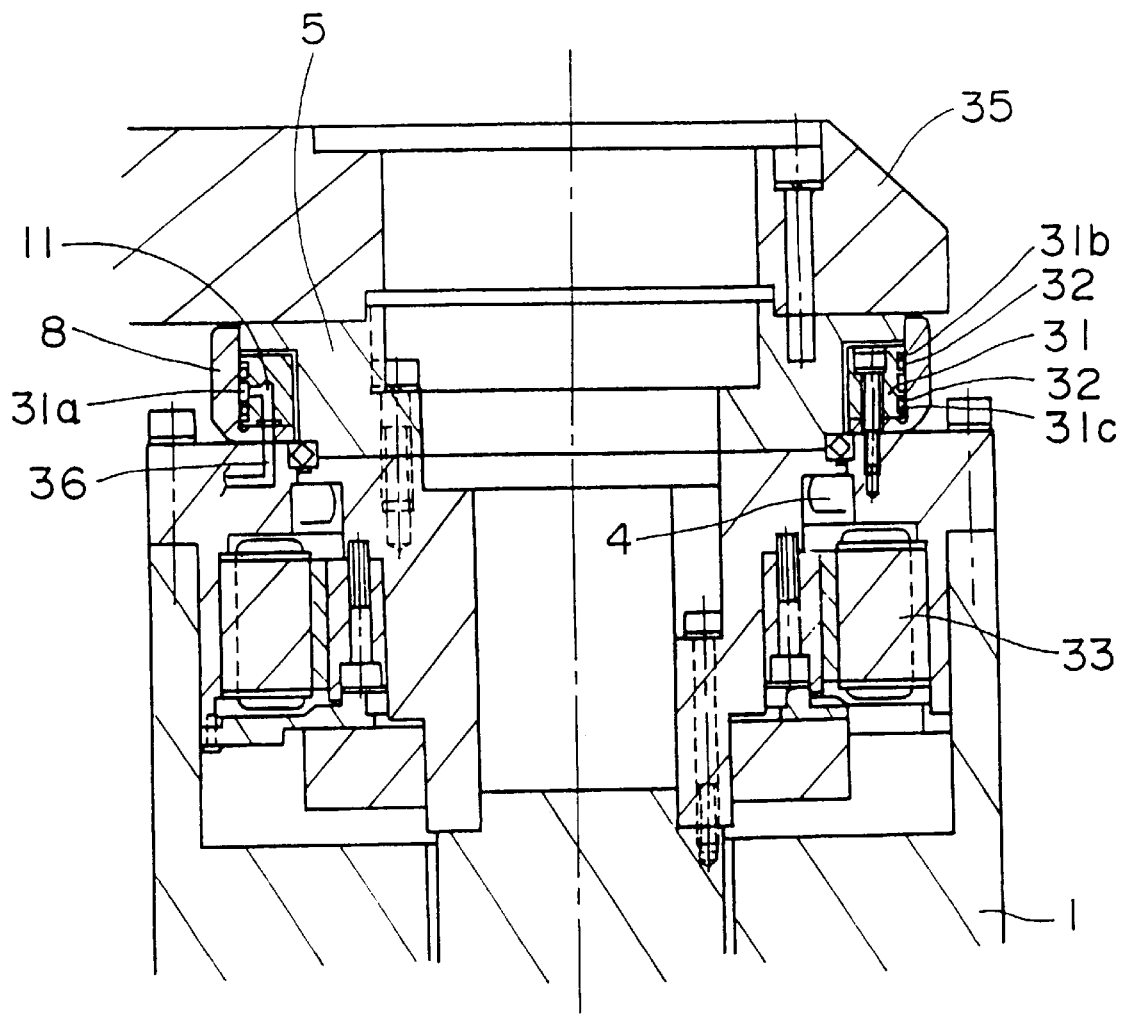
FIG. 3 is a sectional view of a rotary indexing apparatus according to a third embodiment of the present invention.

The rotary indexing apparatus of the third embodiment is a main rotary table of the above-described tilt-and-turn table. That is, as shown in FIG. 3, a base 35 of an auxiliary rotary indexing apparatus is attached to a table 5 of a main rotary indexing apparatus. The main rotary indexing apparatus has basically the same structure as that of the rotary indexing apparatus according to the second embodiment.

Figure 4:
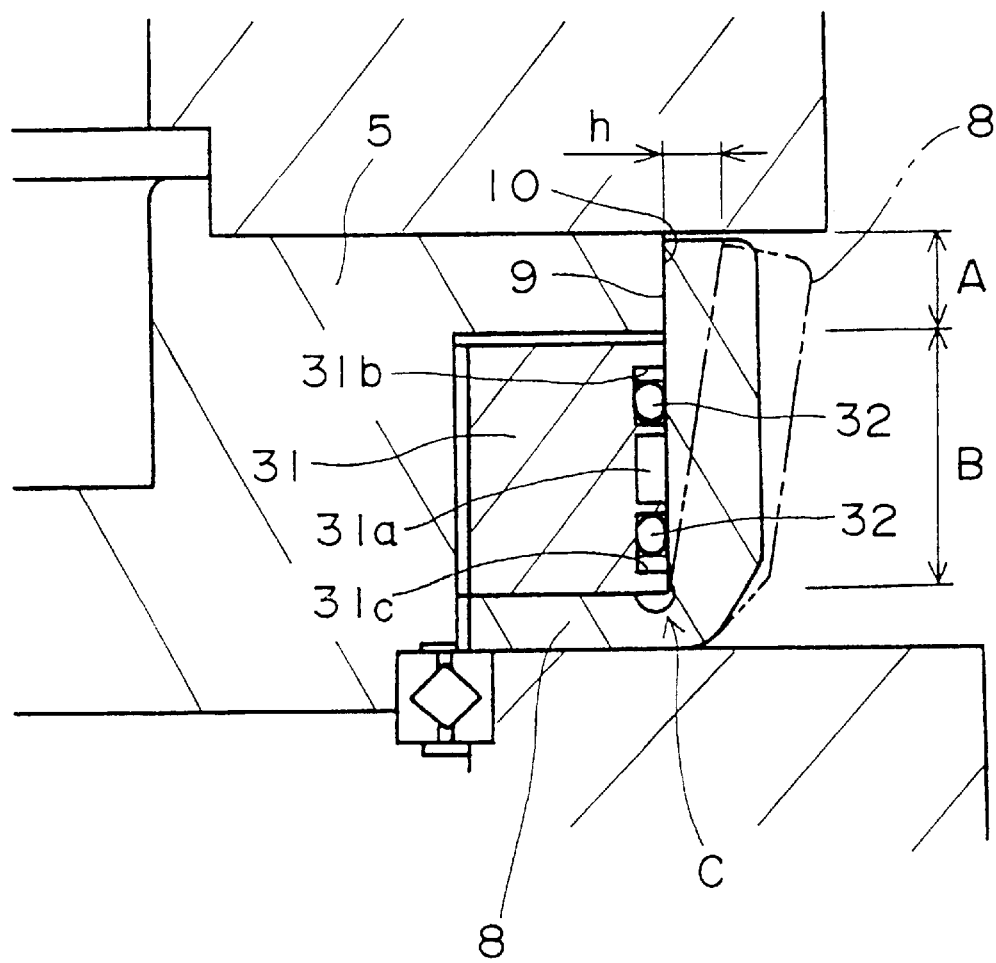
FIG. 4 is an enlarged sectional view showing a deflection of the clamp ring of the rotary indexing apparatus according to the third embodiment.

Specifically, the table 5 is rotatably supported by the base 1 via a cross roller bearing 4 and is rotated by a built-in motor 33. A clamp ring 8 having an L-shaped cross section is disposed to surround the pressure reception surface 10 of the table 5. The clamp ring 8 has a clamp surface 9 which faces the pressure reception surface 10 of the table 5, as shown in FIG. 4.

In the present embodiment, a pressurized oil supply ring 31 is disposed between a smaller-diameter portion of the table 5 and a deflectable vertical portion of the clamp ring 8. The base portion of the clamp ring 8 and the pressurized oil supply ring 31 are fixed to the base 1 with bolts.

The inner diameter of the clamp surface 9 of the clamp ring 8 is designed to be slightly smaller than the diameter of the pressure reception surface 10 of the table 5, so that interference fit is established between the clamp surface 9 and the pressure reception surface 10 in region A.

The pressurized oil supply ring 31 has an outer diameter slightly smaller than that of the pressure reception surface 10, so that a small clearance is formed between the pressurized oil supply ring 31 and the clamp ring 8 in region B. An annular pressure groove 31a and a pair of seal grooves 31b and 31c are formed in the peripheral surface of the pressurized oil supply ring 31, and o-rings 32 are disposed in the seal grooves 31b and 31c, so that a pressure chamber is defined by the pressurized oil supply ring 31, the clamp ring 8, and the o-rings 32. The pressurized oil supply ring 31 is provided with a pressure oil supply passage 11, which communicates with the pressure groove 31a as well as with an unillustrated pressurized oil supply port formed in the base 1 via a connection passage 36.

When the table 5 is to be rotated for carrying out an indexing operation, pressurized oil is supplied to the pressure groove 31a of the pressurized oil supply ring 31 via the connection passage 36 and the pressure oil supply passage 11, so that the pressure within the pressure chamber defined by the pressurized oil supply ring 31, the clamp ring 8, and the o-rings 32 increases. As a result, the clamp ring 8 is deflected in the outward direction in order to unclamp the table 5. At this time, the o-rings 32 prevent the pressurized oil from leaking from the pressure chamber.

Since the clamp ring 8 is thinner as compared with those in the first and second embodiments, the clamp ring 8 can be deflected at a lower pressure. Moreover, the size of the pump for supplying the pressurized oil can be decreased, because the pressurized oil is not circulated.

Fourth Embodiment

In the rotary indexing apparatus of the third embodiment, the clamp ring 8 has an L-shaped cross section. Therefore, as shown in FIG. 4, the clamp ring 8 deflects about a bent portion C serving as a fulcrum, thus increasing the amount h of displacement of the portion where interference fit is established. However, stress concentrates at the bent portion, resulting in decreased durability.

A rotary indexing apparatus of a fourth embodiment solves this drawback.

In the rotary indexing apparatus of the forth embodiment, the clamp ring 8 has a cylindrical shape.

Figure 5:
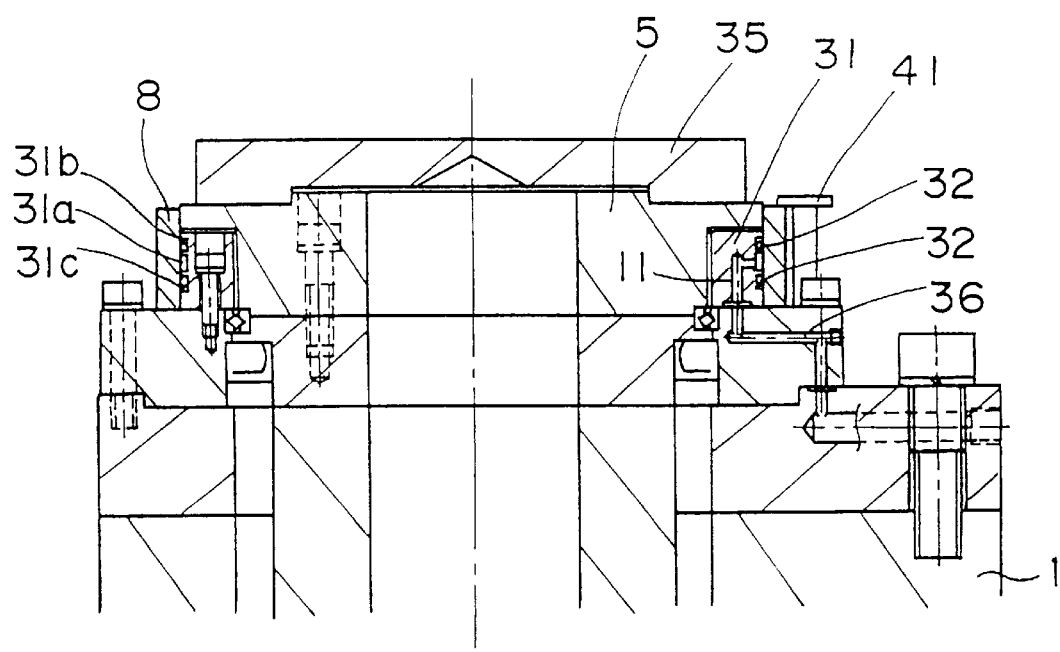
FIG. 5 is a sectional view of a rotary indexing apparatus according to a fourth embodiment of the present invention.
Figure 6:
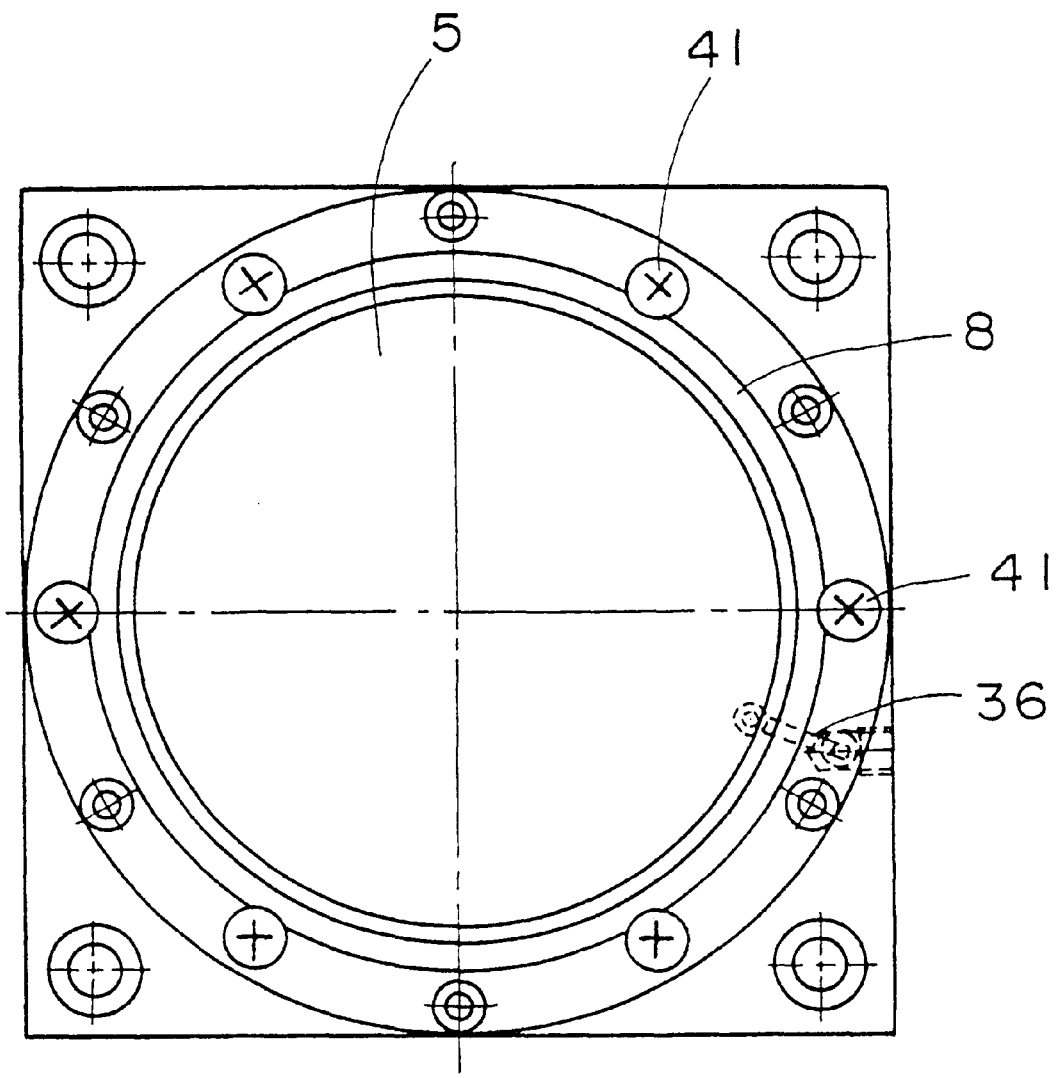
FIG. 6 is a plane view of the rotary indexing apparatus according to the fourth embodiment.

As shown in FIGS. 5 and 6, the clamp ring 8 is not fixed in the radial direction and is positioned only in the vertical direction through use of bolts 41.

Figure 7:
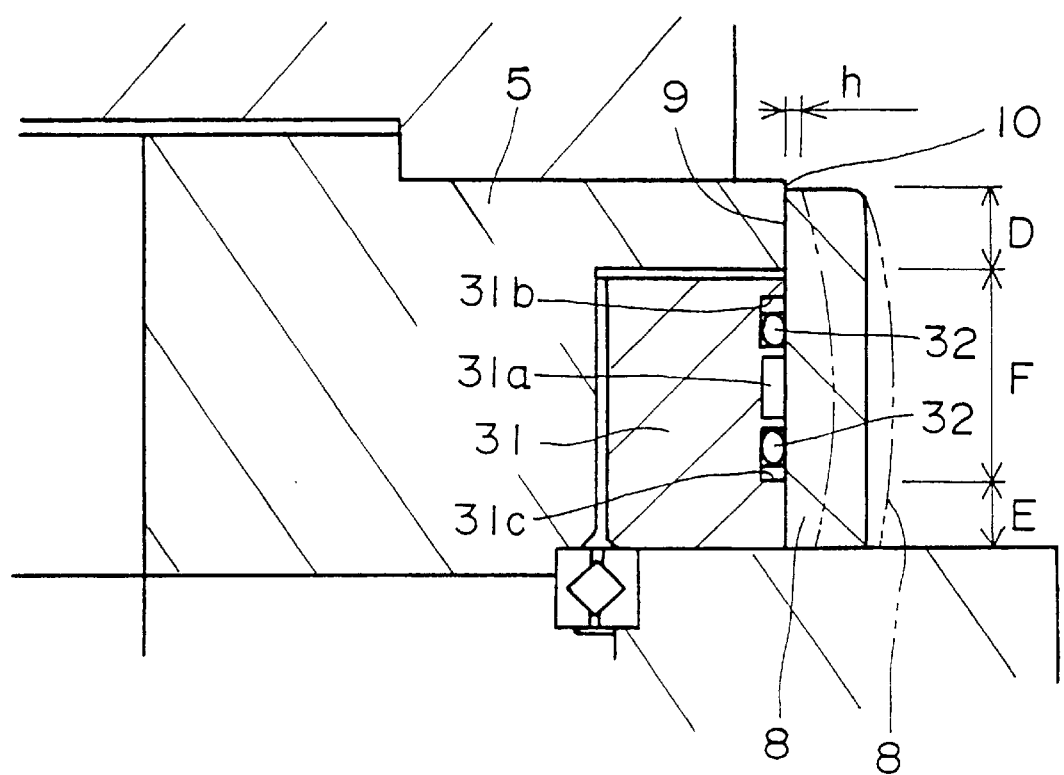
FIG. 7 is an enlarged sectional view showing a deflection of the clamp ring of the rotary indexing apparatus according to the fourth embodiment.

As in the second embodiment, a pressurized oil supply ring 31 is disposed between a smaller-diameter portion of the table 5 and the clamp ring 8. The inner diameter of the clamp surface 9 of the clamp ring 8 is designed to be slightly smaller than the diameter of the pressure reception surface 10 of the table 5, so that interference fit is established between the clamp surface 9 and the pressure reception surface 10 in region D shown in FIG. 7. In region F, the pressurized oil supply ring 31 has an outer diameter slightly smaller than that of the pressure reception surface 10, so that a small clearance is formed between the pressurized oil supply ring 31 and the clamp ring 8. In region E, the pressurized oil supply ring 31 has an outer diameter substantially identical with that of the pressure reception surface 10, so that interference fit is established in region E.

When the table 5 is to be rotated for carrying out an indexing operation, pressurized oil is supplied to the pressure groove 31a of the pressurized oil supply ring 31 as in the third embodiment, thus increasing the pressure within the pressure chamber. As a result, the clamp ring 8 is deflected in the outward direction as indicated by the chain line in FIG. 7. Although the deflection amount h is small, no stress concentration occurs, thus improving the durability.

In the above-described embodiments, interference fit is established between the inner circumferential surface of the clamp ring 8 and the outer circumferential surface of the table 5. However, the structure can be modified such that interference fit is established between the outer circumferential surface of the clamp ring 8 and the inner circumferential surface of the table 5.

The present invention can be used not only in workpiece turntables of machine tools but also in various kinds of indexing apparatuses. For example, the present invention can be applied to an arm indexing portion of an articulated industrial robot, so that the problem of insufficient positioning rigidity (a weak point of the robot) can be solved. Since the apparatus of the present invention has a simple structure and does not require a large-diameter cylinder, the apparatus of the present invention can be made small and compact, enabling the indexing apparatus of the present invention to be used for arms of industrial robots in order to increase positioning rigidity.

Obviously, numerous modifications and variations of the present invention are possible in light of the above teachings. It is therefore to be understood that within the scope of the appended claims, the present invention may be practiced otherwise than as specifically described herein.

What is claimed is:

1. A rotary indexing apparatus comprising:
    a base;
    a table rotatably supported on said base;
    a drive element connected for rotating said table;
    a clamp ring fixed to said base to surround said table or to be surrounded by said table, an interference fit being established between said clamp ring and said table in order to clamp said table; and
    a hydraulic circuit having a fluid outlet positioned to radially deflect said clamp ring in order to unclamp said table,
    wherein said table has a pressure reception surface that extends in the circumferential direction; said clamp ring has a deflectable portion with a clamp surface that extends in the circumferential direction and faces the pressure reception surface; and said hydraulic circuit is formed in a pressurized oil supply ring disposed between said table and said deflectable portion of said clamp ring, a pressure chamber formed between said pressurized oil supply ring and the deflectable portion of said clamp ring, and a pressurized fluid supply passage formed within said pressurized oil supply ring and adapted to supply pressurized fluid to said pressure chamber.

2. A rotary indexing apparatus according to claim 1, wherein said clamp ring has an L-shaped cross section.

3. A rotary indexing apparatus comprising:

a base;

a table rotatably supported on said base;

a drive element connected for rotating said table;

a clamp ring fixed to said base to surround said table or to be surrounded by said table, an interference fit being established between said clamp ring and said table in order to clamp said table; and a hydraulic circuit having a fluid outlet positioned to radially deflect said clamp ring in order to unclamp said table, wherein said table has a pressure reception surface that extends in the circumferential direction; said clamp ring is formed of a radially expandable cylindrical member and has a clamp surface that extends in the circumferential direction and faces the pressure reception surface; and said hydraulic circuit is formed in a pressurized oil supply ring disposed between said table and said clamp ring, a pressure chamber formed between said pressurized oil supply ring and said clamp ring, and a pressurized fluid supply passage formed within said pressurized oil supply ring and adapted to supply pressurized fluid to said pressure chamber.

* * * * *